United States Patent [19]

Chang

[11] 4,084,305

[45] Apr. 18, 1978

[54] PULLEY PULLER

[76] Inventor: Yun-Te Chang, 47, Li Te 11 Road, Lin 8, Ta Te Li Tainan, China /Taiwan

[21] Appl. No.: 753,865

[22] Filed: Dec. 23, 1976

[51] Int. Cl.[2] .............................................. B23P 19/04

[52] U.S. Cl. ...................................................... 29/261

[58] Field of Search ................................. 29/261, 262

[56] References Cited

U.S. PATENT DOCUMENTS

| | | | |
|---|---|---|---|
| 1,709,913 | 4/1929 | Kaplan | 29/261 |
| 2,360,781 | 10/1944 | McGinnis et al. | 29/261 |

FOREIGN PATENT DOCUMENTS

| | | | |
|---|---|---|---|
| 825,624 | 12/1937 | France | 29/261 |

*Primary Examiner*—James L. Jones, Jr.

*Attorney, Agent, or Firm*—Straugh, Nolan, Neale, Nies & Kurz

[57] ABSTRACT

An improved construction of a pulley puller and in particular a pulley puller wherein two pull pawls and a base are provided with two flanges and two grooves respectively to provide stability at the point where they meet supportively, tractive members formed in one piece are disposed between the pull pawls and the base, a fixed ring is casted integrally with the base, the base also having a central hole having therein an internal thread, a hexagonal flange end is formed integrally at one end of the central hole and a supported screw rod is fitted through the central hole so that when operating the pulley puller it will remain stable and the pull pawls will not slip or otherwise slide out of the contact surface between the pull pawls and the base.

5 Claims, 6 Drawing Figures

A — A

PULLEY PULLER

BACKGROUND OF THE INVENTION

Flywheels, bearings, bushings and various other parts of machines in general often need replacing. To remove these parts it is necessary to use what is commonly referred to as pulley puller. However, the construction of conventional pulley pullers is impractical for this purpose. The operation is often difficult and due to inherent defects in their construction, parts are often damaged. These defects will be explained with reference to FIGS. 1 and 2 of the appended drawings which show the construction of prior art pulley pullers.

1. The point of contact P between the pull pawl 12 and the base 10 is provided with less friction or catch means so that during operation it is very easy for these two parts to slip apart at this point P as the screw rod 13 is turned, causing damage to these parts, including tractive means 11, causing operation failure.

2. The tractive members comprise two separate plates 11 fastened to either side of the pull pawl 12 and the base 10. After repeated use these tractive members 11 will lose their ability to resist, turning of the base 10 and the tractive means 11 will be easily misshapen rendering them ineffective.

3. As the area of the base 10 against which the pull pawls 12 are supported is very small, the stability given thereby will be very poor.

4. As no means are provided for fixing or holding the position of the base 10, said base 10 will tend to turn when the screw rod 13 is turned making operation very cumbersome.

The purpose of the present invention is to reduce or eliminatethe above said defects and to provide a novel and practical device of simple operation wherein parts will not slip or be damaged and which will not make undesirable motions.

The characteristics and efficiency of the presentinvention will now be explained with reference to FIGS. 3–6 of the appended drawings wherein.

Figure 4:
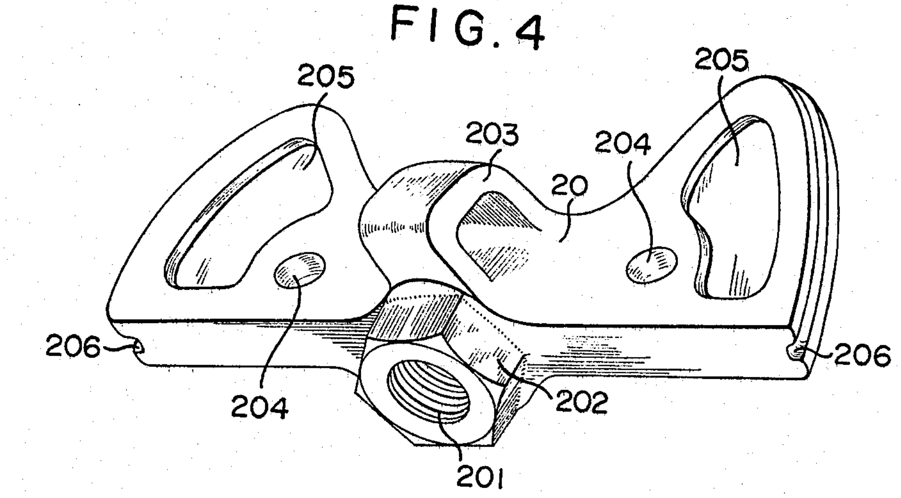
FIG. 4 is a view of the generally perspective view of the base member according to the present invention.
Figure 5:
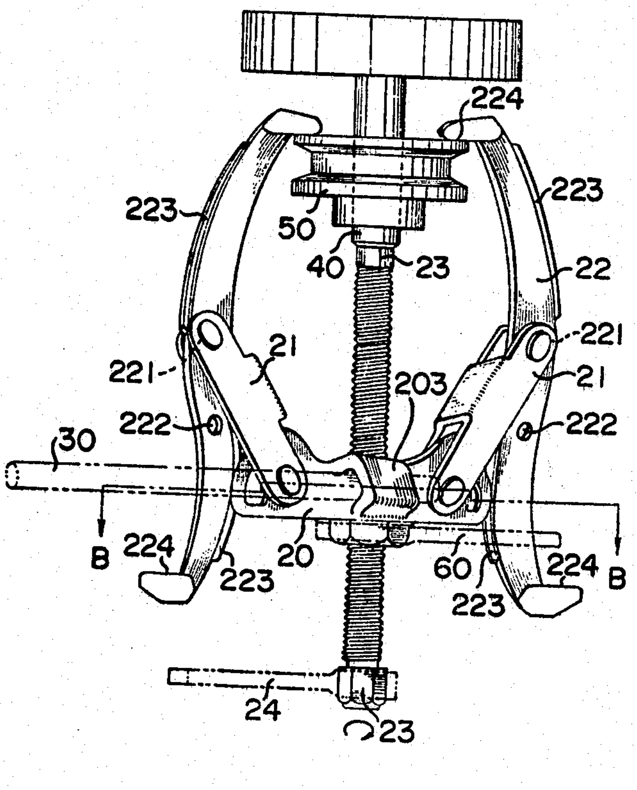
FIG. 5 is a composite side view of a preferred embodiment according to the present invention.
Figure 6:
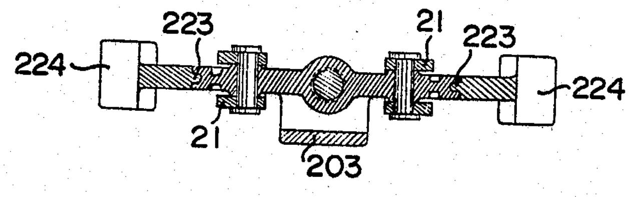
FIG. 6 is a view in section thereof taken along lines B—B in FIG. 5.

As shown in the drawings a pulley puller constructedin accordance with the present invention is provided with a base 20 have disposed through the central portion thereof a threaded hole 201. At one end of the hole 201 is a nut-like projection 202 which may be cast integrally with the base 20. Also cast integrally with the base 20 is a fixed ring 203. Holes 204–204 are provided, one one either side of the fixed ring 203. The side-end of the base 20 end in enlarged portions 205–205 which may be provided with recessed faces as shown in FIG. 4 for the purpose of saving material and decreasing weight, and along the outside periphery of these enlarged portions are provided grooves 206–206. Tractive means comprise members 21 comprise members or links 21 each pivoted at one end at a hole 204 to body 20. The free ends of the tractive members or links 21 are attached to pull pawls 22 at suitable holes 221 or 222 respectively by means of a pin.

Figure 1:
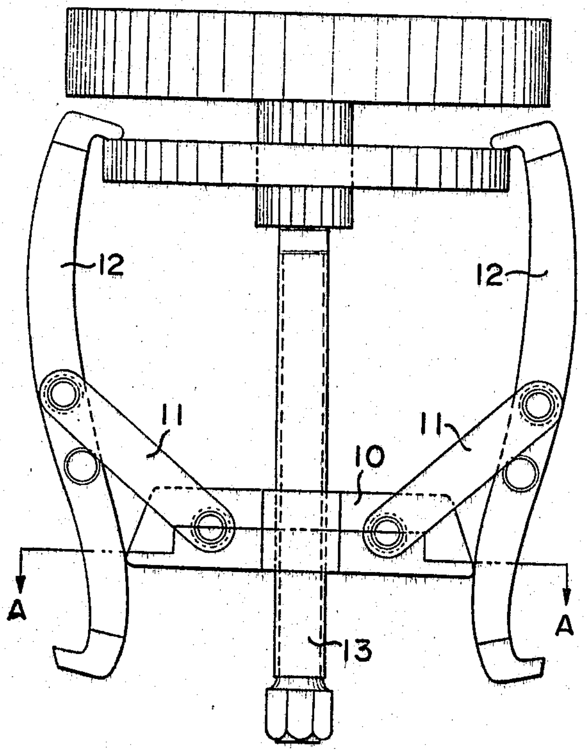
FIG. 1 (PRIOR ART)
FIG. 1 and 2 show construction of prior art pulley pullers.
Figure 2:
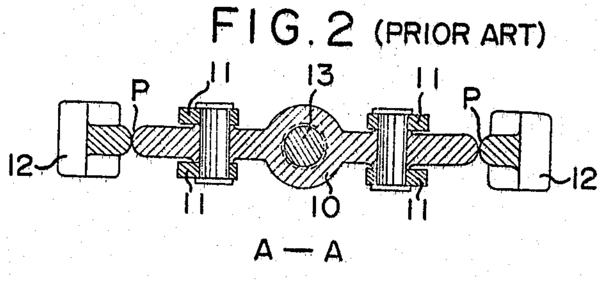
FIG. 2 (PRIOR ART)
Figure 3:
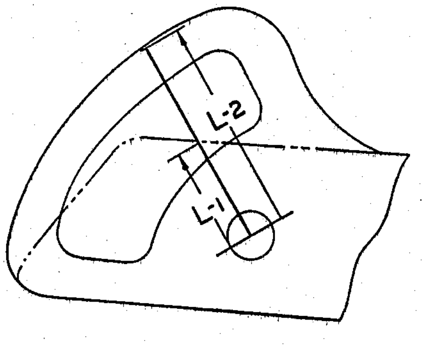
FIG. 3 is a fragmentary view illustrating comparison between the base ends of conventional devices and that of the present invention illustrating how tractive means obtain more support when the present invention is used.

As shown in FIG. 3, due to the fact that the line L-2 is always longer than L-1, the fit of the base 20, tractive means 21, and pull pawls 22 is much more stable than that of the prior art.

The pull pawls 22 are in the form of an elongated "S" and longitudinally extending flanges 223 corresponding in dimensions to the previously said grooves 206 are provided along the periphery of the pull pawls 22 respectively. When the pull pawls 22 are held against the base 20, the flanges 223 thereof will fit into the grooves 206 of the base 20, eliminating any undesirable slipping of the pull pawls 22 on the base 20. A screw rod 23 is screwed through the hole 201 and a support rod 30 is provided through the fixed ring 203.

To begin the dismounting of a flywheel or the like, the improved pulley puller according to the present invention is positioned directly in front of a working shaft 40 allowing the lips 224–224 of the pull pawls 22–22 to enter behind the flywheel 50 while the flanges 223 of the pull pawls 22 enter the grooves 206 of the base 20, turning the screw rod so that it comes tight against the end of the work shaft 40. To remove the flywheel 50 from the shaft 40, the screw rod is turned by means of a wrench 24 while at the same time force is applied in the opposite direction by means of the support rod 30 or by means of a second wrench 60 in conjunction with nut 202 preventing the base 20 from turning with the screw rod 23. As the base 20 does notturn with the screw rod 23 it will move backwards along the screw rod away from the flywheel 50 pulling the tractive means 21 and pull pawls 22 with it, thereby pulling the flywheel 50 from the work shaft 40.

Of course flanges 223 of the pull pawls 22 may also be grooves and the grooves 206 of the base 20 flanges without affecting the efficiency of the device. Whether to connect the tractive means 21 to the pull pawl 22 by means of holes 221 or holes 222 depends on the size of the flywheel 50. When the correct holes have been ascertained, the flywheel or other machine part may be taken off of the shaft quickly and smoothly.

I claim:

1. A puller for removing a pulley or the like from a shaft comprising an elongated base having a substantially central threaded hole therethrough, a screw rod rotatably mounted in said hole and adapted at one end to engage the end of a shaft carrying a pulley to be removed, a pair of pull pawls extending along opposite sides of said screw rod and formed at their ends corresponding to said shaft engaging end of the screw rod with pulley engaging lips, said pawls having intermediate oppositely facing inner portions bearing on opposite end portions of said base, tractive members pivoted at opposite ends to said pawls and to said base at opposite sides of said threaded hole, and slidably interfitting flange and groove means on said pawl and base end portions extending longitudinally of said pawls.

2. A puller as defined in claim 1, wherein the opposite end portions of said base are enlarged and are formed with said grooves, and the inner edges of said pawls are formed with said flanges.

3. A puller as defined in claim 2, means providing a nut-like projection on said base at the end of said threaded hole opposite that adapted to face said shaft.

4. A puller as defined in claim 3, means providing a rigid support rod mounting ring on a side of said base adjacent said threaded hole.

5. A puller as defined in claim 1, wherein said pawls each have pulley engaging lips at opposite ends and are formed with longitudinally spaced pivot means for option attachment of the tractive members thereto.

* * * * *